United States Patent
Asai

(10) Patent No.: US 10,176,923 B2
(45) Date of Patent: Jan. 8, 2019

(54) CERAMIC ELECTRONIC COMPONENT AND METHOD OF PRODUCING THE SAME

(71) Applicant: Taiyo Yuden Co., Ltd., Tokyo (JP)

(72) Inventor: Takashi Asai, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 15/476,256

(22) Filed: Mar. 31, 2017

(65) Prior Publication Data
US 2017/0301470 A1    Oct. 19, 2017

(30) Foreign Application Priority Data
Apr. 14, 2016  (JP) ................. 2016-080786

(51) Int. Cl.
| H01G 4/30 | (2006.01) |
| H01G 4/248 | (2006.01) |
| H01G 4/005 | (2006.01) |
| H01G 4/12 | (2006.01) |

(52) U.S. Cl.
CPC .......... *H01G 4/30* (2013.01); *H01G 4/005* (2013.01); *H01G 4/12* (2013.01); *H01G 4/248* (2013.01)

(58) Field of Classification Search
None
See application file for complete search history.

(56) References Cited

U.S. PATENT DOCUMENTS

| 5,144,527 | A * | 9/1992 | Amano | H01G 4/012 |
| | | | | 29/25.42 |
| 6,329,311 | B1 * | 12/2001 | Fujii | C04B 35/486 |
| | | | | 361/321.4 |
| 8,411,409 | B2 * | 4/2013 | Ogawa | H01C 1/14 |
| | | | | 361/301.4 |
| 9,779,873 | B2 * | 10/2017 | Kim | H01G 4/12 |
| 2012/0147516 | A1 * | 6/2012 | Kim | H01G 4/232 |
| | | | | 361/301.4 |
| 2012/0229949 | A1 * | 9/2012 | Kim | H01G 4/005 |
| | | | | 361/321.2 |
| 2012/0262840 | A1 * | 10/2012 | Koizumi | H01G 4/1209 |
| | | | | 361/321.2 |
| 2015/0340155 | A1 * | 11/2015 | Fukunaga | H01G 4/012 |
| | | | | 361/301.4 |

FOREIGN PATENT DOCUMENTS

JP    2013084871 A    5/2013

* cited by examiner

*Primary Examiner* — Dion R Ferguson
(74) *Attorney, Agent, or Firm* — Saliwanchik, Lloyd & Eisenschenk

(57) ABSTRACT

A ceramic electronic component includes a body, a first external electrode, and a second external electrode. The body includes a first end surface and a second end surface that face each other, surfaces each extending between the first end surface and the second end surface, an outer edge that is provided along the surfaces and includes recesses, the recesses extending from the first end surface and the second end surface along ridges of the surfaces, and a functional unit that is disposed inward relative to the outer edge. The first external electrode and the second external electrode respectively cover the first end surface and the second end surface and extend to come close to each other from the first end surface and the second end surface along the surfaces and the recesses.

16 Claims, 14 Drawing Sheets

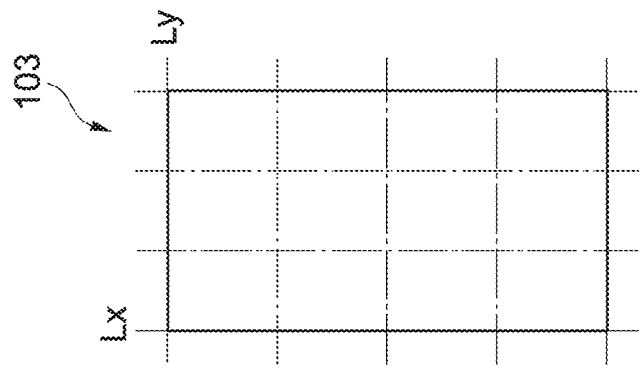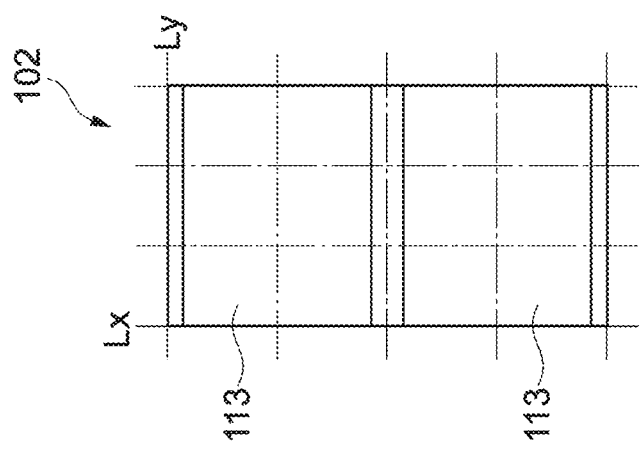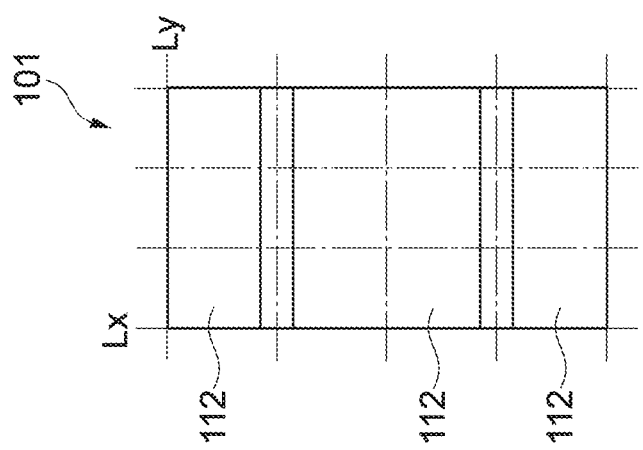

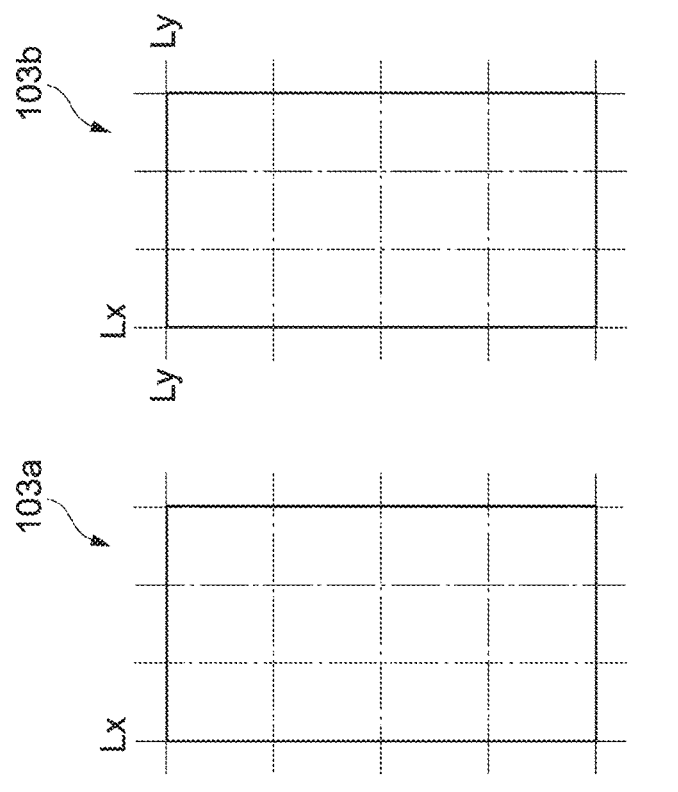
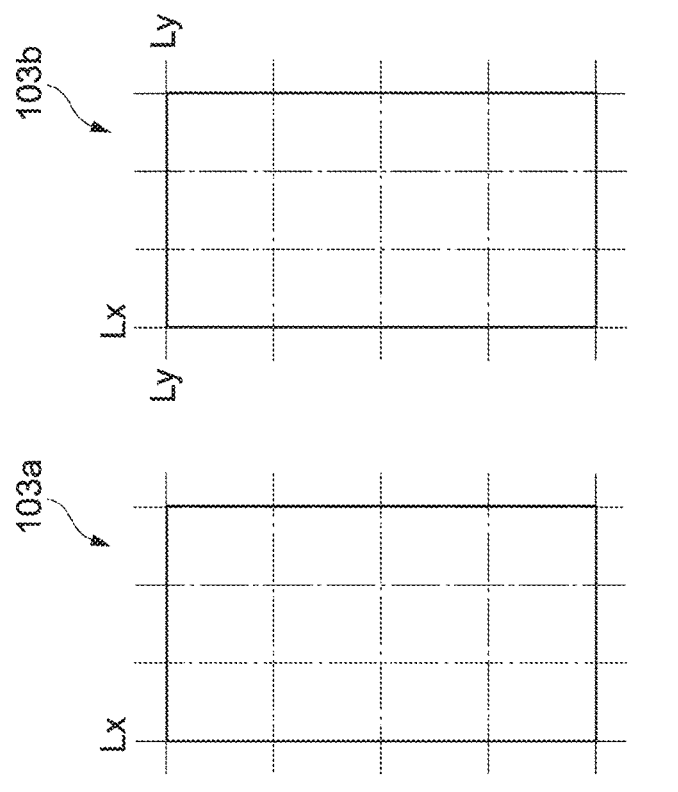
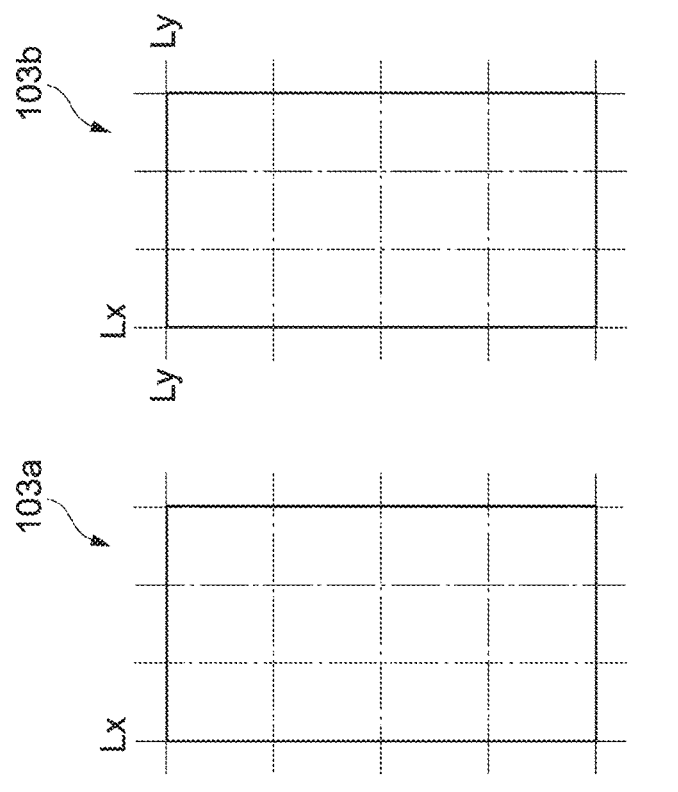
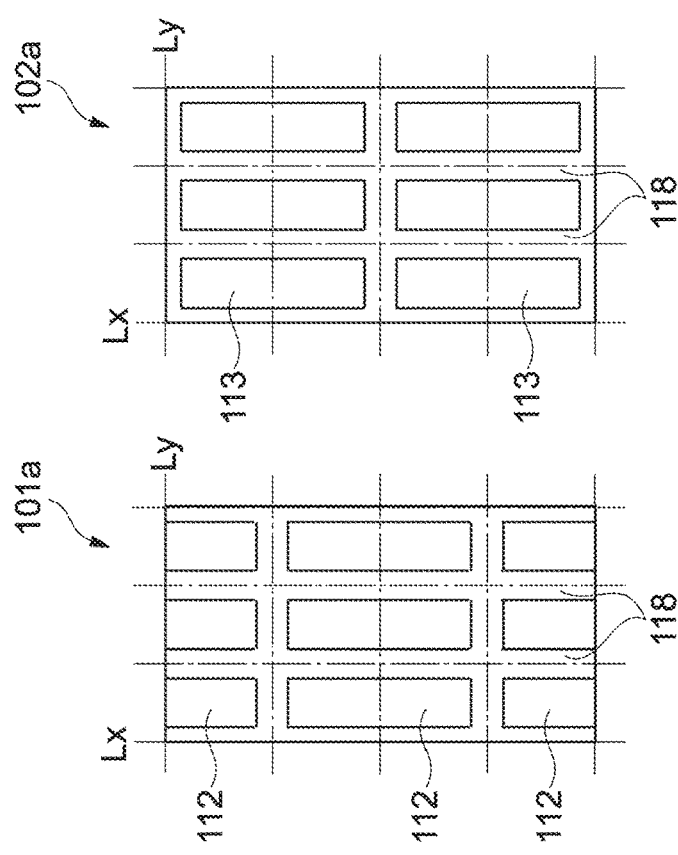

CERAMIC ELECTRONIC COMPONENT AND METHOD OF PRODUCING THE SAME

CROSS REFERENCE TO RELATED APPLICATION

This application claims priority under 35 U.S.C. § 119 to Japanese Patent Application No. 2016-080786, filed Apr. 14, 2016, which is herein incorporated by reference in its entirety.

BACKGROUND

The present invention relates to a ceramic electronic component including a pair of external electrodes and to a method of producing the ceramic electronic component.

Along with miniaturization of electronic devices and achievement of high performance thereof, there have recently been increasingly strong demands for miniaturization and increase in capacity with respect to multi-layer ceramic capacitors used in the electronic devices. In order to increase the capacity of the multi-layer ceramic capacitor in a determined dimension, for example, it is effective to make external electrodes thin and thus enlarge an area for internal electrodes.

The external electrodes are provided by, for example, performing plating on base films obtained when an electrical conductive paste applied to the body of the multi-layer ceramic capacitor is baked. So, in order to reduce the thickness of the external electrodes, it is effective to use an electrical conductive paste having a low viscosity to make the base films thin.

However, when the electrical conductive paste is applied to the body, the electrical conductive paste inevitably becomes thin at the corners of the body. So, when the electrical conductive paste having a low viscosity is used, the base films may be disconnected at the corners of the body, and the corners of the body may be exposed. In such a case, the base films are peeled off at the corners of the body, and gaps are easier to generate between the body and the base films.

When gaps are generated between the body and the base films, a plating solution enters the gaps between the body and the base films during plating. Due to this entry of the plating solution, a normal function may not be obtained in the multi-layer ceramic capacitor after the plating. Further, the gaps are left between the body and the external electrodes obtained after the plating.

If there are gaps between the body and the external electrodes, during use of the multi-layer ceramic capacitor, for example, moisture in the atmosphere may infiltrate into the gaps between the body and the external electrodes, and an insulation failure may occur. Therefore, the reduction in thickness of the external electrodes makes it difficult to ensure reliability of the multi-layer ceramic capacitor.

In contrast to this, Japanese Patent Application Laid-open No. 2013-84871 discloses a technique in which dummy electrodes, which are not connected to internal electrodes, are exposed in areas of a body where external electrodes are provided. In this technique, the external electrodes have good connection properties with the dummy electrodes made of metal, and the external electrodes are thus difficult to disconnect in the areas where the dummy electrodes are exposed.

BRIEF SUMMARY

In the above-mentioned technique according to Japanese Patent Application Laid-open No. 2013-84871, however, it takes a lot of time and effort to provide the dummy electrodes. This makes the production process complicated and increases the production cost. For those reasons, there is a demand for achievement of a technique in which a new member such as a dummy electrode is not provided and reliability is not impaired even if the thickness of each external electrode is reduced.

In view of the circumstances as described above, it is desirable to provide a ceramic electronic component and a method of producing the same, which are capable of reducing the thickness of an external electrode.

According to an embodiment of the present invention, there is provided a ceramic electronic component including: a body; and a first external electrode and a second external electrode.

The body includes a first end surface and a second end surface that face each other, surfaces each extending between the first end surface and the second end surface, an outer edge that is provided along the surfaces and includes recesses, the recesses extending from the first end surface and the second end surface along ridges of the surfaces, and a functional unit that is disposed inward relative to the outer edge.

The first external electrode and the second external electrode respectively cover the first end surface and the second end surface and extend to come close to each other from the first end surface and the second end surface along the surfaces and the recesses.

In this configuration, the recesses are formed at the corners of the body where the first and second external electrodes are easy to disconnect. This causes the first and second external electrodes to enter the recesses at the corners of the body, and thus the thickness of each of the first and second external electrodes is ensured. Therefore, in this configuration, even when the first and second external electrodes are made thin, the first and second external electrodes can be prevented from being disconnected at the corners of the body.

Each of the first external electrode and the second external electrode may be disposed at each of the recesses inward relative to a line of intersection, at which planes respectively extended from the surfaces intersect with one another.

In this configuration, even when the thickness of each of the first and second external electrodes is reduced to such an extent that the first and second external electrodes may be disconnected without recesses, the first and second external electrodes can be prevented from being disconnected by the action of the recesses.

The surfaces may include a first main surface, a second main surface, a first side surface, and a second side surface, the first main surface and the second main surface facing each other, the first side surface and the second side surface facing each other.

The outer edge may include a first cover, a second cover, a first side margin, and a second side margin, the first cover and the second cover being respectively provided along the first main surface and the second main surface, the first side margin and the second side margin being respectively provided along the first side surface and the second side surface.

A depth of each of the recesses from the first main surface and the second main surface may be equal to or smaller than a thickness of each of the first cover and the second cover, and a depth of each of the recesses from the first side surface and the second side surface may be 40% or less of a thickness of each of the first side margin and the second side margin.

Further, a depth of each of the recesses from the first side surface and the second side surface may be equal to or smaller than a thickness of each of the first side margin and the second side margin, and a depth of each of the recesses from the first main surface and the second main surface may be 40% or less of a thickness of each of the first cover and the second cover.

The outer edge may have a thickness of 2 μm or more and 100 μm or less.

In those configurations, the first and second covers and the first and second side margins can more effectively protect the functional unit.

According to another embodiment of the present invention, there is provided a method of producing a ceramic electronic component, the ceramic electronic component includes a body and first and second external electrodes.

The body includes a first end surface and a second end surface that face each other, surfaces each extending between the first end surface and the second end surface, an outer edge that is provided along the surfaces, and a functional unit that is disposed inward relative to the outer edge.

The first external electrode and the second external electrode respectively cover the first end surface and the second end surface and extend to come close to each other from the first end surface and the second end surface along the surfaces.

The method includes forming recesses on the outer edge, the recesses extending from the first end surface and the second end surface along ridges of the surfaces and then forming the first external electrode and the second external electrode.

In this configuration, the first and second external electrodes remain within the recesses previously formed at the corners of the body, and the thickness of each of the first and second external electrodes is thus ensured at the corners of the body. With this configuration, even when the thickness of each of the first and second external electrodes is reduced, the first and second external electrodes can be prevented from being disconnected at the corners of the body.

The outer edge may include a first cover, a second cover, a first side margin, and a second side margin, the first cover and the second cover facing each other, the first side margin and the second side margin facing each other.

In this case, for example, the first side margin and the second side margin may be formed on a multi-layer chip to produce the body, the multi-layer chip including the functional unit, the first cover, and the second cover that are pressure-bonded to one another, the body being unsintered.

The first side margin and the second side margin that are formed on the body may be dried to shrink, to form the recesses, the body being unsintered.

The body may be subjected to processing to form the recesses, the body being unsintered.

The processing may include barrel polishing.

Further, the body may be produced, the body being unsintered and including the first cover and the second cover that are made of a material having a larger shrinking percentage at sintering than a material of the functional unit, the first side margin, and the second side margin, and the body may be sintered to form the recesses, the body being unsintered.

In this case, for example, the first cover and the second cover may be made of a material that is easier to generate a liquid phase at sintering than the material of the functional unit, the first side margin, and the second side margin.

Further, the first cover and the second cover may be made of a material having a smaller proportion of base powder than the material of the functional unit, the first side margin, and the second side margin.

Furthermore, the first cover and the second cover may be made of a material having a smaller average particle diameter of base powder than the material of the functional unit, the first side margin, and the second side margin.

In those configurations, it is possible to easily form the recesses at the corners of the body. With this configuration, it is possible to produce a ceramic electronic component in which the thickness of an external electrode can be reduced without making a production process complicated or increasing in production cost.

According to the present invention, it is possible to provide a ceramic electronic component and a method of producing the ceramic electronic component, which are capable of reducing the thickness of an external electrode.

These and other objects, features and advantages of the present invention will become more apparent in light of the following detailed description of embodiments thereof, as illustrated in the accompanying drawings.

BRIEF DESCRIPTION OF THE DRAWINGS

FIGS. 8A, 8B, and 8C are plan views of ceramic sheets prepared in Step S1-01 of the production example 1;

FIGS. 16A, 16B, 16C, and 16D are plan views of ceramic sheets prepared in Step S2-01 of the production example 2;

DETAILED DESCRIPTION

Hereinafter, embodiments of the present invention will be described with reference to the drawings.

In the figures, an X axis, a Y axis, and a Z axis orthogonal to one another are shown as appropriate. The X axis, the Y axis, and the Z axis are common in all figures.

1. Overall Configuration of Multi-Layer Ceramic Capacitor 10

FIGS. 1 to 4 each show a multi-layer ceramic capacitor 10 according to an embodiment of the present invention.

Figure 1:
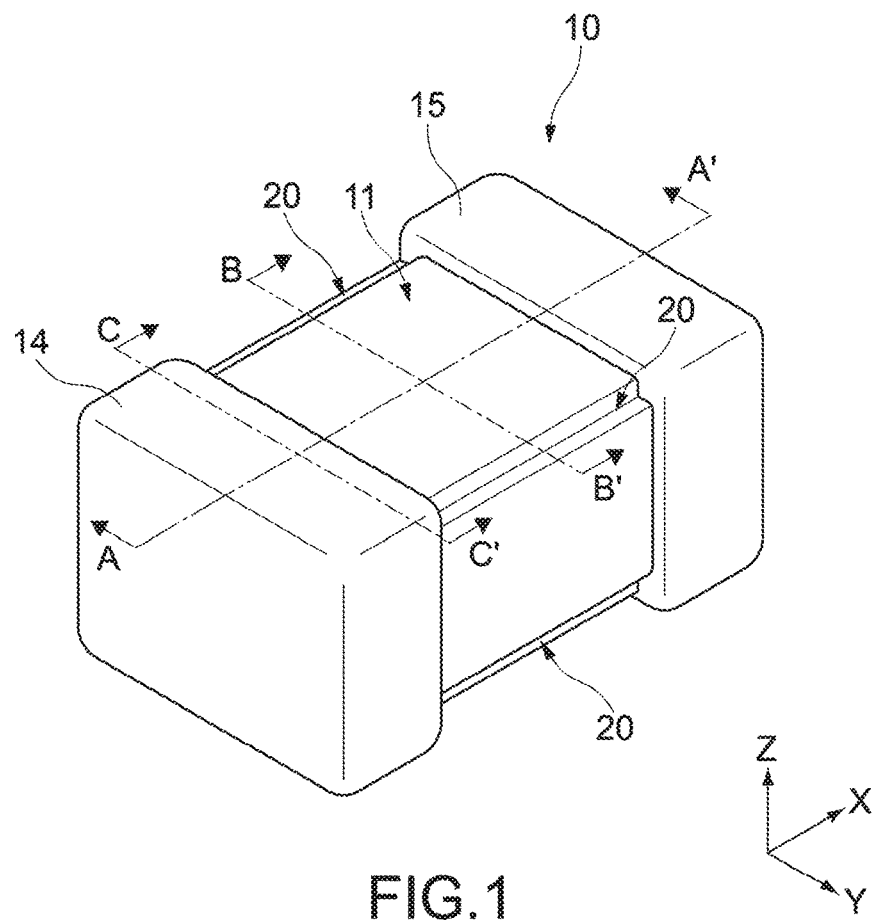
FIG. 1 is a perspective view of a multi-layer ceramic capacitor according to one embodiment of the present invention.
Figure 2:
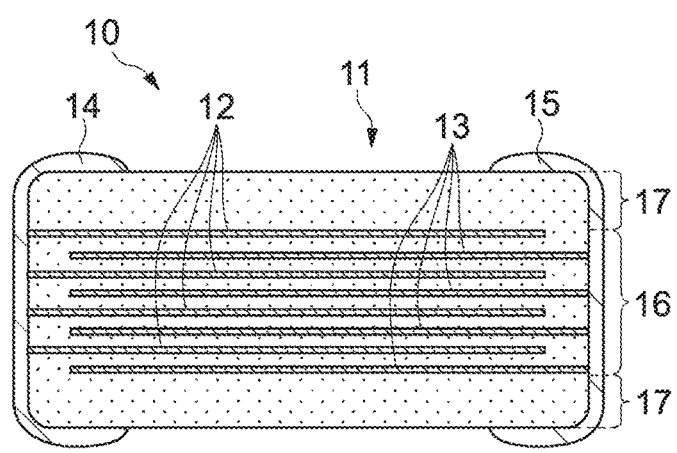
FIG. 2 is a cross-sectional view of the multi-layer ceramic capacitor taken along the A-A' line in FIG. 1.
Figure 3:
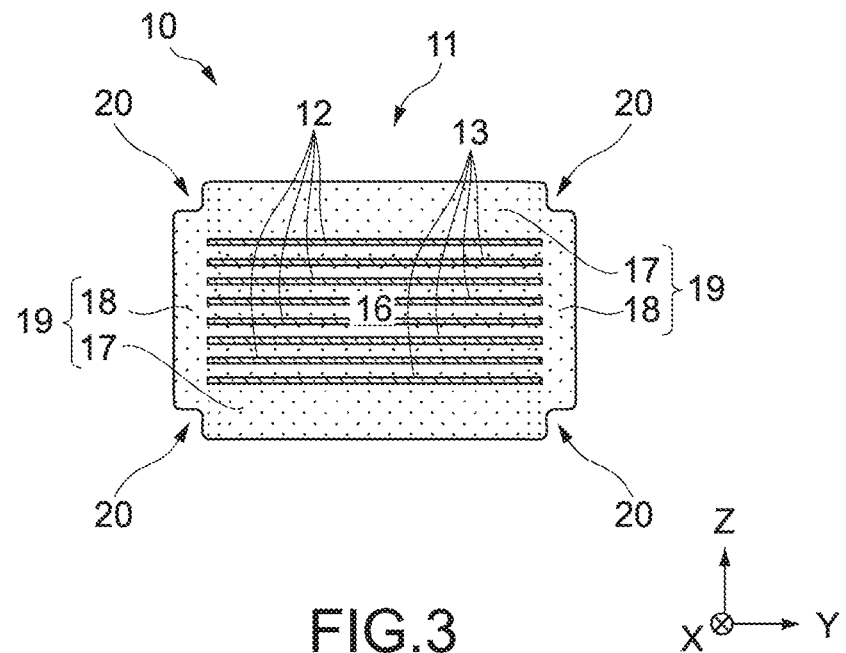
FIG. 3 is a cross-sectional view of the multi-layer ceramic capacitor taken along the B-B' line in FIG. 1.
Figure 4:
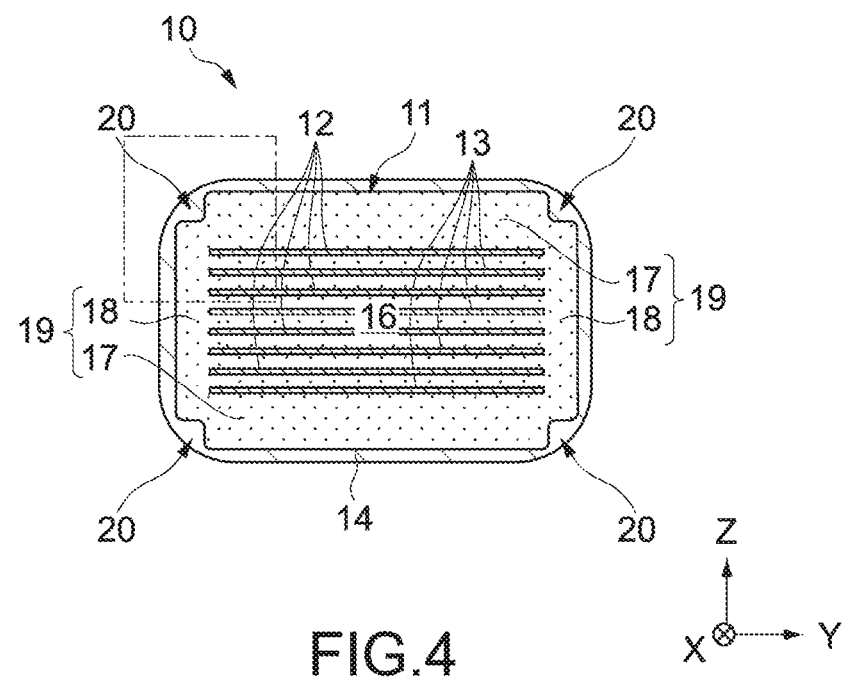
FIG. 4 is a cross-sectional view of the multi-layer ceramic capacitor taken along the C-C' line in FIG. 1.

FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1. FIG. 4 is a cross-sectional view of the multi-layer ceramic capacitor 10 taken along the C-C' line in FIG. 1.

The multi-layer ceramic capacitor 10 includes a body 11, a first external electrode 14, and a second external electrode 15. The first external electrode 14 and the second external electrode 15 are apart from each other and face each other in an X-axis direction while sandwiching the body 11 therebetween.

The body 11 has a hexahedral shape having two end surfaces oriented in the X-axis direction, two side surfaces oriented in a Y-axis direction, and two main surfaces oriented in a Z-axis direction. In the body 11, for example, a dimension in the X-axis direction can be set to 1.0 mm and dimensions in the Y- and Z-axis directions can be set to 0.5 mm.

It should be noted that the body 11 may not have the hexahedral shape in a precise sense. For example, the surfaces of the body 11 may be curved surfaces, and the body 11 may be rounded as a whole.

Further, the body 11 includes recesses 20 that extend in the X-axis direction respectively along four ridges of the side surfaces and main surfaces. The recesses 20 are each provided over the entire width of the body 11 in the X-axis direction and form respective grooves recessed from the side surfaces and main surfaces. A detailed configuration of the recesses 20 according to this embodiment will be described later.

The first external electrode 14 and the second external electrode 15 cover both the end surfaces of the body 11 and extend so as to come close to each other from both the end surfaces along the side surfaces and the main surfaces. With this configuration, both of the first external electrode 14 and the second external electrode 15 have U-shaped cross sections in parallel with an X-Z plane and an X-Y plane.

The first external electrode 14 and the second external electrode 15 are each formed from a good conductor of electricity and function as terminals of the multi-layer ceramic capacitor 10. Examples of the good conductor of electricity forming the first and second external electrodes 14 and 15 include metal mainly containing nickel (Ni), copper (Cu), palladium (Pd), platinum (Pt), silver (Ag), gold (Au), or the like, and an alloy of those metals.

The first and second external electrodes 14 and 15 may have a single-layer structure or multi-layer structure.

The first and second external electrodes 14 and 15 of the multi-layer structure may be formed to have a double-layer structure including a base film and a surface film, or a three-layer structure including a base film, an intermediate film, and a surface film, for example.

The base film can be a baked film made of metal mainly containing nickel, copper, palladium, platinum, silver, gold, or the like, or an alloy of those metals, for example.

The intermediate film can be a plating film made of metal mainly containing platinum, palladium, gold, copper, nickel, or the like, or an alloy of those metals, for example.

The surface film can be a plating film made of metal mainly containing copper, tin, palladium, gold, zinc, or the like, or an alloy of those metals, for example.

The body 11 includes a capacitance forming unit 16 and an outer edge 19. The capacitance forming unit 16 is formed to be a functional unit having a function of storing charge of the multi-layer ceramic capacitor 10. The outer edge 19 is formed along the side surfaces and main surfaces of the body 11 and covers the capacitance forming unit 16 in the Z-axis direction and the Y-axis direction. The outer edge 19 has main functions of protecting the capacitance forming unit 16 and ensuring insulation properties of the periphery of the capacitance forming unit 16.

The outer edge 19 includes covers 17 and side margins 18. The covers 17 have a flat plate-like shape extending along the X-Y plane and cover the capacitance forming unit 16 from both sides in the Z-axis direction. The side margins 18 have a flat plate-like shape extending along the X-Z plane and cover the capacitance forming unit 16 from both sides in the Y-axis direction.

The capacitance forming unit 16 includes a plurality of first internal electrodes 12 and a plurality of second internal electrodes 13. The first internal electrodes 12 and the second internal electrodes 13 each have a sheet-like shape extending along the X-Y plane and are alternately disposed along the Z-axis direction. The first internal electrodes 12 are connected to the first external electrode 14 and are apart from the second external electrode 15. To the contrary, the second internal electrodes 13 are connected to the second external electrode 15 and are apart from the first external electrode 14.

The first internal electrodes 12 and the second internal electrodes 13 are each formed from a good conductor of electricity and function as internal electrodes of the multi-layer ceramic capacitor 10. Examples of the good conductor of electricity forming the first and second internal electrodes 12 and 13 include nickel (Ni), copper (Cu), palladium (Pd), platinum (Pt), silver (Ag), gold (Au), and a metal material including an alloy of those metals.

The capacitance forming unit 16 is made of dielectric ceramics. In the multi-layer ceramic capacitor 10, in order to increase capacitances of respective layers made of dielectric ceramics (hereinafter, referred to as dielectric ceramic layers in some cases) provided between the first and second internal electrodes 12 and 13, dielectric ceramics having a high dielectric constant is used as a material forming the capacitance forming unit 16. Examples of the dielectric ceramics having a high dielectric constant include a material having a Perovskite structure containing barium (Ba) and titanium (Ti), which is typified by barium titanate ($BaTiO_3$).

Further, examples of the dielectric ceramics forming the capacitance forming unit 16 may also include a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate (BaZrO$_3$) based material, or a titanium oxide (TiO$_2$) based material, in addition to the barium titanate based material.

The covers 17 and the side margins 18 are also made of dielectric ceramics. A material of the covers 17 and the side margins 18 only needs to be insulating ceramics, but use of a material having a composition system similar to that of the material of the capacitance forming unit 16 leads to improvement in production efficiency and suppression of internal stress in the body 11.

With the configuration described above, when a voltage is applied between the first external electrode 14 and the second external electrode 15 in the multi-layer ceramic capacitor 10, a voltage is applied to the dielectric ceramic layers between the first and second internal electrodes 12 and 13. With this configuration, the multi-layer ceramic capacitor 10 stores charge corresponding to the voltage applied between the first external electrode 14 and the second external electrode 15.

It should be noted that the configuration of the multi-layer ceramic capacitor 10 is not limited to a specific configuration, and a well-known configuration can be used as appropriate in accordance with the size and performance expected for the multi-layer ceramic capacitor 10. For example, the number of first internal electrodes 12 and second internal electrodes 13 in the capacitance forming unit 16 can be determined as appropriate.

2. Detailed Configuration of Recesses 20

In the multi-layer ceramic capacitor 10, the first external electrode 14 and the second external electrode 15 are formed to be thin. With this configuration, the multi-layer ceramic capacitor 10 can ensure a large area for forming the capacitance forming unit 16 and thus have a large capacity.

In a general configuration, when the first external electrode 14 and the second external electrode 15 are made thin, the first external electrode 14 and the second external electrode 15 at the corners of the body 11 become extremely thin. Thus, the first external electrode 14 and the second external electrode 15 may be disconnected. In other words, the first external electrode 14 is easy to disconnect at the four corners of the body 11 where the first external electrode 14 is formed, and the second external electrode 15 is easy to disconnect at the four corners of the body 11 where the second external electrode 15 is formed.

In this regard, in the multi-layer ceramic capacitor 10 according to this embodiment, as shown in FIG. 4, the first external electrode 14 and the second external electrode 15 enter the recesses 20, and the thickness of the first external electrode 14 and the thickness of the second external electrode 15 are ensured in areas along the recesses 20. Since the recesses 20 are continuous to the corners of the body 11, the thickness of the first external electrode 14 and the thickness of the second external electrode 15 are ensured also at the corners of the body 11.

In such a manner, in the multi-layer ceramic capacitor 10, even when the first external electrode 14 and the second external electrode 15 are made thin, the first external electrode 14 and the second external electrode 15 are difficult to disconnect at the corners of the body 11. Therefore, in the multi-layer ceramic capacitor 10, the first external electrode 14 and the second external electrode 15 are not peeled off at the corners of the body 11, and thus an insulation failure due to the infiltration of moisture in the atmosphere is difficult to occur.

As described above, in the multi-layer ceramic capacitor 10, even when the first external electrode 14 and the second external electrode 15 are made thin, reliability is not lost by the action of the recesses 20.

Figure 5:
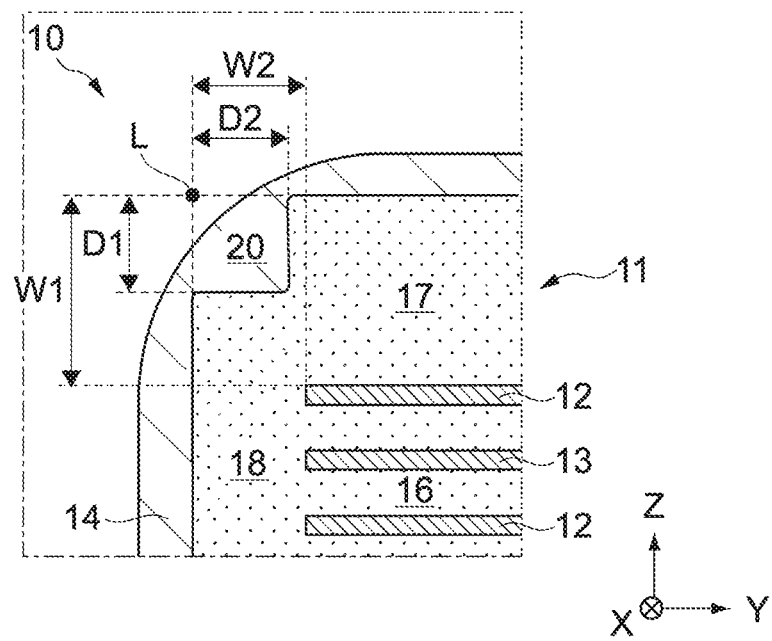
FIG. 5 is an enlarged cross-sectional view of a portion of the multi-layer ceramic capacitor, which is surrounded by a chain line in FIG. 4.

FIG. 5 is an enlarged partial cross-sectional view of the recess 20 and an area around the recess 20, which are surrounded by a chain line in FIG. 4. It should be noted that FIG. 5 shows the first external electrode 14, but the second external electrode 15 is formed similarly to the first external electrode 14. Hereinafter, a typical configuration of the recess 20 and the periphery thereof will be described with reference to FIG. 5, but the present invention is not limited thereto.

Each of a thickness W1 of the cover 17 and a thickness W2 of the side margin 18 is desirably 2 μm or more and 100 μm or less. The thickness W1 and the thickness W2 are set to 2 μm or more, so that the cover 17 and the side margin 18 can more effectively protect the capacitance forming unit 16. The thickness W1 and the thickness W2 are kept to 100 μm or less, so that a large area for providing the capacitance forming unit 16 can be ensured. This is advantageous to provide the multi-layer ceramic capacitor 10 with a large capacity.

A depth D1 of the recess 20 from the main surface of the body 11 is set to be the thickness W1 or less of the cover 17. Further, a depth D2 of the recess 20 from the side surface of the body 11 is set to be the thickness W2 or less of the side margin 18. With this configuration, insulation properties between the first and second external electrodes 14 and 15 and the first and second internal electrodes 12 and 13 in the recesses 20 are successfully ensured.

Furthermore, the depth D1 of the recess 20 is desirably 40% or less of the thickness W1 of the cover 17, and the depth D2 of the recess 20 is desirably 40% or less of the thickness W2 of the side margin 18. When at least one of the depth D1 and the depth D2 of the recess 20 satisfies the above condition, insulation properties between the first and second external electrodes 14 and 15 and the first and second internal electrodes 12 and 13 in the recesses 20 are more successfully ensured.

FIG. 5 shows a line of intersection L at which a plane on which the main surface of the body 11 is extended intersects with a plane on which the side surface of the body 11 is extended. In the multi-layer ceramic capacitor 10, since the first external electrode 14 and the second external electrode 15 are thin, the first external electrode 14 and the second external electrode 15 are each disposed inward relative to the line of intersection L in the recess 20 of the body 11.

Figure 6:
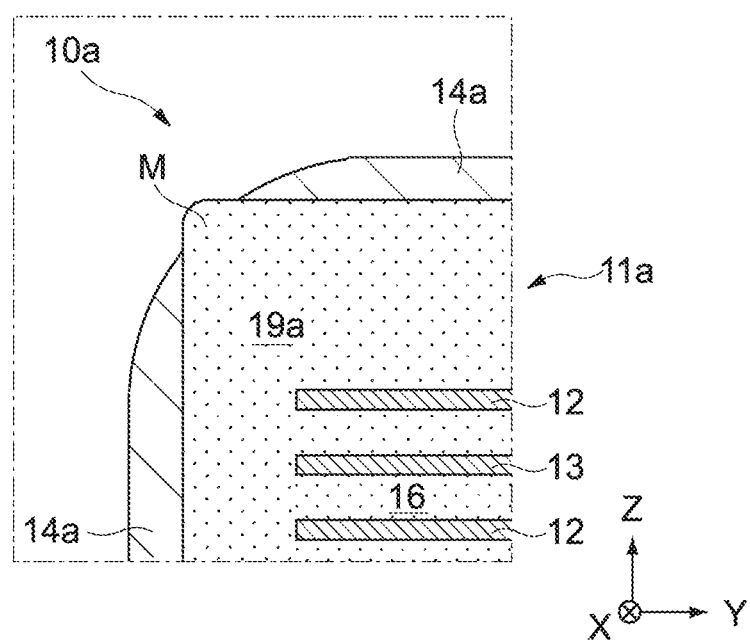
FIG. 6 is an enlarged cross-sectional view of a multi-layer ceramic capacitor according to a comparative example of the embodiment.

FIG. 6 is a partial cross-sectional view of a multi-layer ceramic capacitor 10a according to a comparative example of this embodiment. The multi-layer ceramic capacitor 10a according to the comparative example is different from the multi-layer ceramic capacitor 10 according to this embodiment in that a recess is not provided at an outer edge 19a of a body 11a, and a side surface and a main surface of the body 11a are connected to each other at a ridge M.

In the multi-layer ceramic capacitor 10a according to the comparative example, if external electrodes 14a and 15a are made thin similarly to the first and second external electrodes 14 and 15 of the multi-layer ceramic capacitor 10 according to this embodiment, each of the external electrodes 14a and 15a is disconnected at the ridge M of the body 11a. As a result, as shown in FIG. 6, the ridge M of the body 11a is exposed.

Therefore, in the multi-layer ceramic capacitor 10a according to the comparative example, if the external electrodes 14a and 15a are made thin, the reliably is lost in contrast to the multi-layer ceramic capacitor 10 according to this embodiment.

3. Production Example 1 of Multi-Layer Ceramic Capacitor 10

Figure 7:
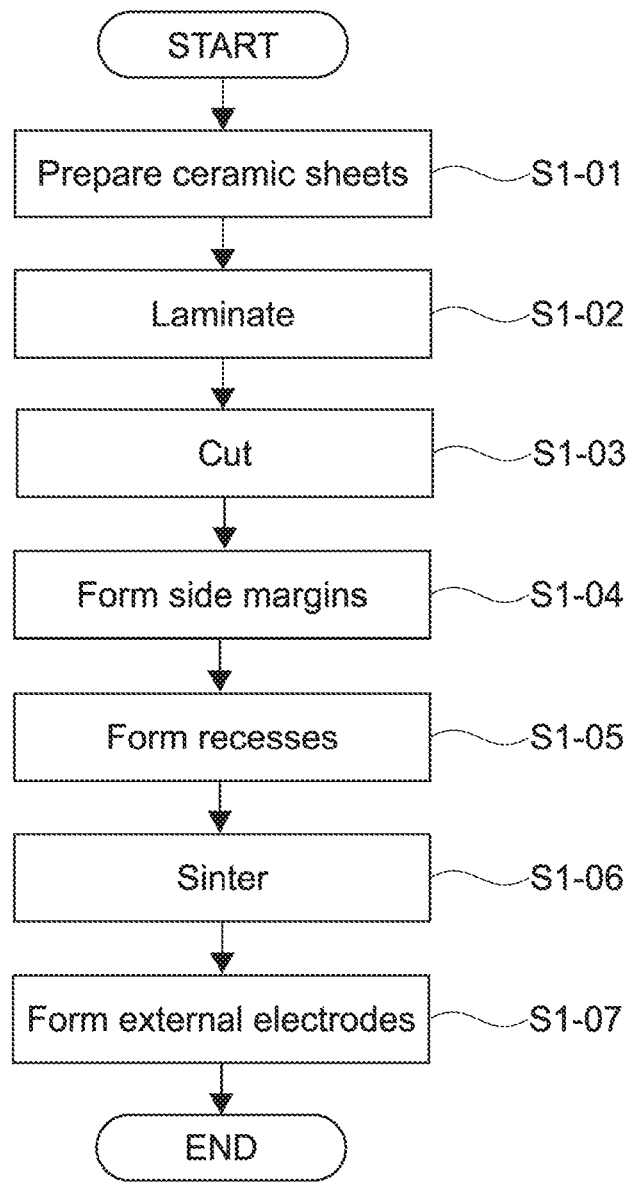
FIG. 7 is a flowchart showing a production example 1 of the multi-layer ceramic capacitor.

FIG. 7 is a flowchart showing a production example 1 of the multi-layer ceramic capacitor 10. FIGS. 8A to 13 are views each showing a process of the production example 1 of the multi-layer ceramic capacitor 10. Hereinafter, the production example 1 of the multi-layer ceramic capacitor 10 will be described along FIG. 7 with reference to FIGS. 8A to 13 as appropriate.

3.1 Step S1-01: Preparation of Ceramic Sheets

In Step S1-01, first ceramic sheets 101 and second ceramic sheets 102 for forming the capacitance forming unit 16, and third ceramic sheets 103 for forming the covers 17 are prepared.

FIGS. 8A, 8B, and 8C are plan views of the first, second, and third ceramic sheets 101, 102, and 103, respectively. FIG. 8A shows the first ceramic sheet 101, FIG. 8B shows the second ceramic sheet 102, and FIG. 8C shows the third ceramic sheet 103. The first, second, and third ceramic sheets 101, 102, and 103 are configured as unsintered dielectric green sheets and formed into a sheet shape by using a roll coater or a doctor blade, for example.

At the stage of Step S1-01, the first, second, and third ceramic sheets 101, 102, and 103 are not yet cut into the multi-layer ceramic capacitors 10. FIGS. 8A, 8B, and 8C each show cutting lines Lx and Ly used when the sheets are cut into the multi-layer ceramic capacitors 10. The cutting lines Lx are parallel to the X axis, and the cutting lines Ly are parallel to the Y axis.

As shown in FIGS. 8A, 8B, and 8C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. It should be noted that no internal electrodes are formed on the third ceramic sheet 103 corresponding to the cover 17.

The first and second internal electrodes 112 and 113 can be formed using any electrical conductive paste. For formation of the first and second internal electrodes 112 and 113 by use of an electrical conductive paste, a screen printing method or a gravure printing method can be used, for example.

Each of the first and second internal electrodes 112 and 113 is disposed over two areas and extends like a belt in the Y-axis direction. The two areas are adjacent to each other in the X-axis direction and divided by the cutting line Ly. The first internal electrodes 112 are shifted from the second internal electrodes 113 in the X-axis direction by one row including the areas divided by the cutting lines Ly. In other words, the cutting line Ly passing through the center of the first internal electrode 112 passes through an area between the second internal electrodes 113, and the cutting line Ly passing through the center of the second internal electrode 113 passes through an area between the first internal electrodes 112.

3.2 Step S1-02: Lamination

In Step S1-02, the first, second, and third ceramic sheets 101, 102, and 103 prepared in Step S1-01 are laminated, to produce a multi-layer sheet 104.

Figure 9:
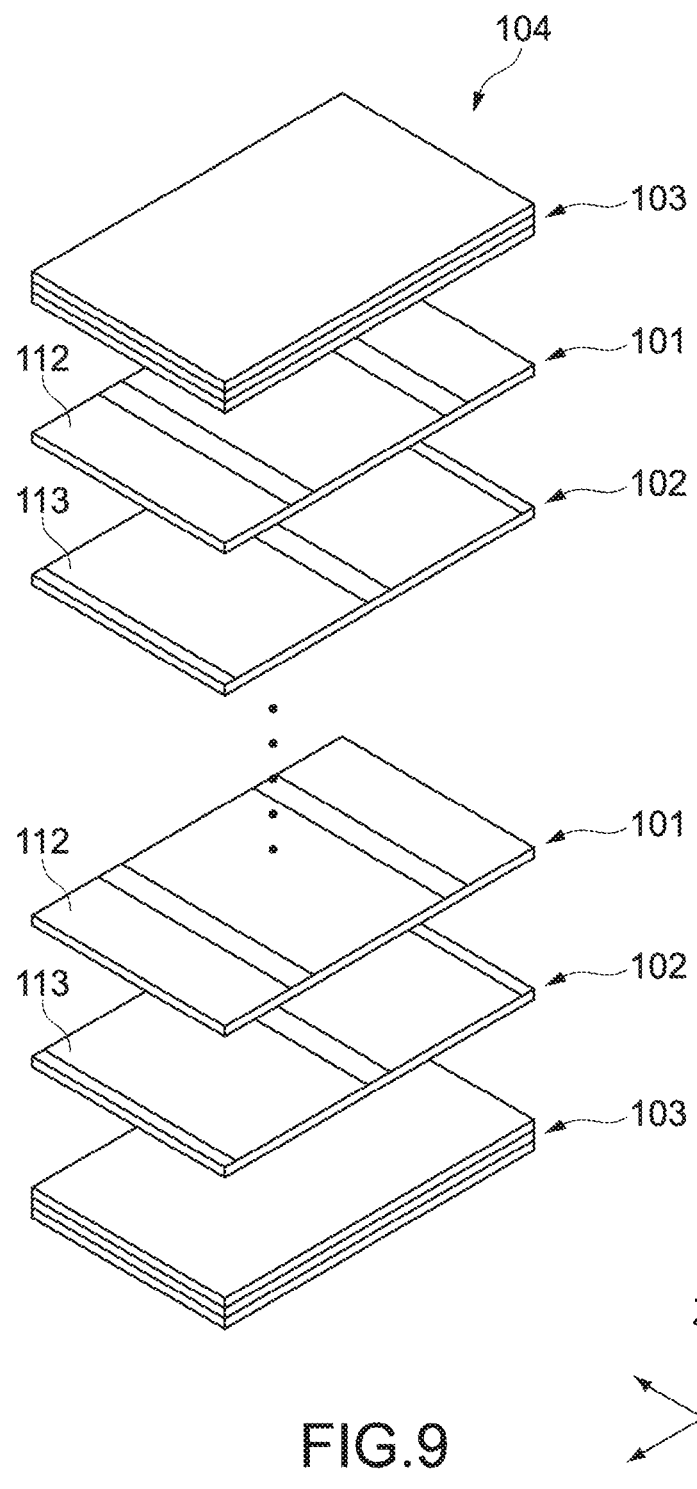
FIG. 9 is a perspective view of a multi-layer sheet produced in Step S1-02 of the production example 1.

FIG. 9 is a perspective view of the multi-layer sheet 104 obtained in Step S1-02. For the purpose of description, FIG. 9 shows the first, second, and third ceramic sheets 101, 102, and 103 in an exploded manner. In an actual multi-layer sheet 104, however, the first, second, and third ceramic sheets 101, 102, and 103 are pressure-bonded by hydrostatic pressing, uniaxial pressing, or the like for integration. With this configuration, a high-density multi-layer sheet 104 is obtained.

In the multi-layer sheet 104, the first ceramic sheets 101 and the second ceramic sheets 102 that correspond to the capacitance forming unit 16 are alternately laminated in the Z-axis direction.

Further, in the multi-layer sheet 104, the third ceramic sheets 103 corresponding to the covers 17 are laminated on the uppermost and lowermost surfaces of the first and second ceramic sheets 101 and 102 alternately laminated in the Z-axis direction. It should be noted that in the example shown in FIG. 9 three third ceramic sheets 103 are laminated on each of the uppermost and lowermost surfaces of the laminated first and second ceramic sheets 101 and 102, but the number of third ceramic sheets 103 can be changed as appropriate.

3.3 Step S1-03: Cutting

In Step S1-03, the multi-layer sheet 104 obtained in Step S1-02 is cut to produce unsintered multi-layer chips 105.

Figure 10:
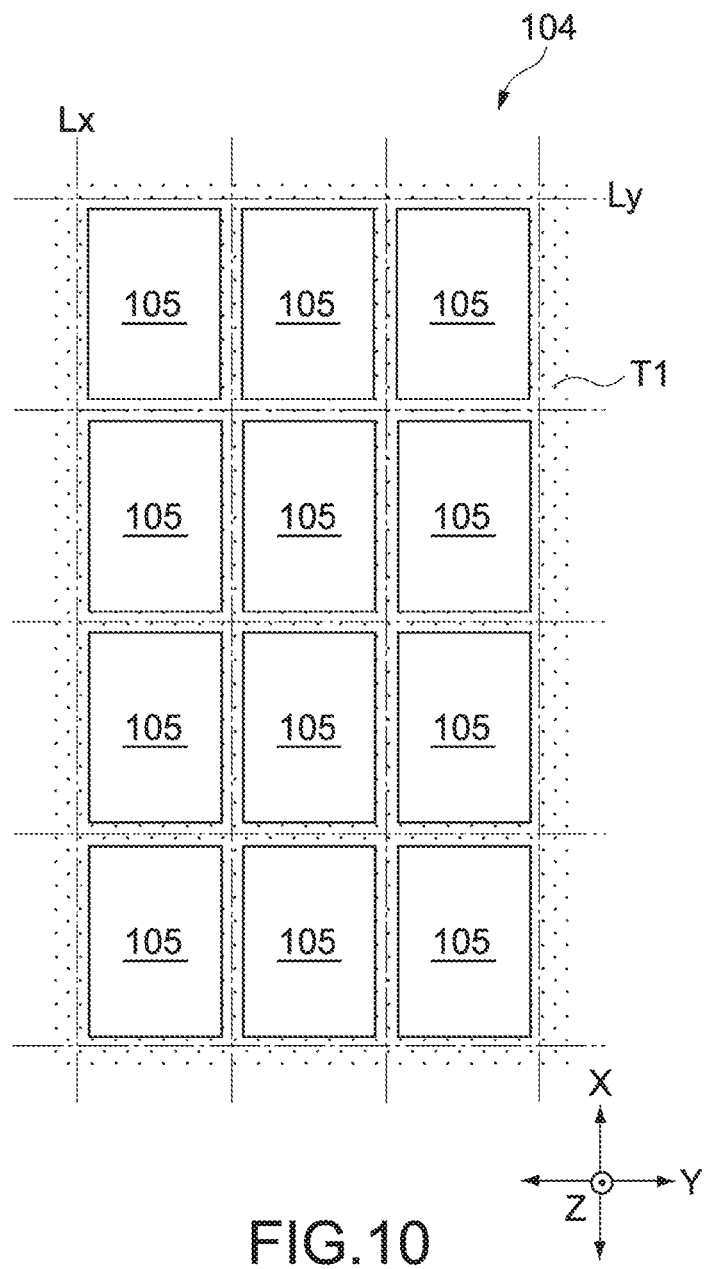
FIG. 10 is a plan view of the multi-layer sheet cut in Step S1-03 of the production example 1.
Figure 11:
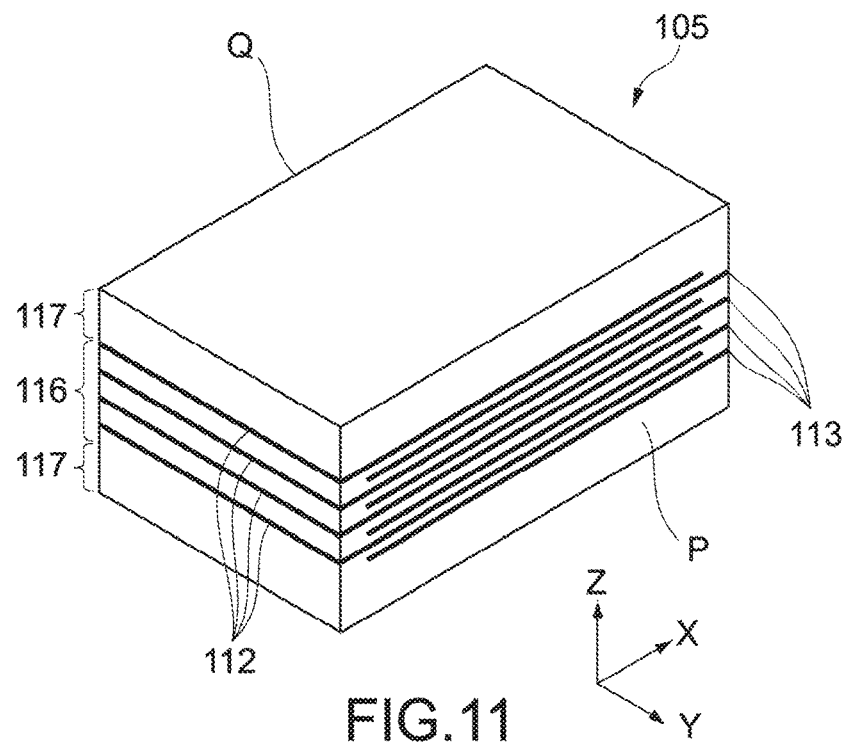
FIG. 11 is a perspective view of a multi-layer chip after Step S1-03 of the production example 1.

FIG. 10 is a plan view of the multi-layer sheet 104 after Step S1-03. The multi-layer sheet 104 is cut along the cutting lines Lx and Ly while being attached to a tape T1 as a holding member. With this configuration, the multi-layer sheet 104 is singulated, and multi-layer chips 105 shown in FIG. 11 are obtained. In each of the multi-layer chips 105, cut surfaces on which the first and second internal electrodes 112 and 113 are exposed, i.e., the side surfaces P and Q, are formed.

A method of cutting the multi-layer sheet 104 is not limited to a specific method. For example, for the cutting of the multi-layer sheet 104, a technique using various blades can be used. Examples of the blades usable for the cutting of the multi-layer sheet 104 include a push-cutting blade and a rotary blade (e.g., dicing blade). Further, for the cutting of the multi-layer sheet 104, for example, laser cutting or water jet cutting can be used in addition to the technique using various blades.

The cut multi-layer chips 105 are cleansed as needed, to remove grinding dust or the like adhering to the side surfaces P and Q or the like of the multi-layer chips 105.

3.4 Step S1-04: Formation of Side Margins

In Step S1-04, unsintered side margins 118 are formed on the side surfaces P and Q of the multi-layer chip 105 obtained in Step S1-03.

The side margins 118 can be formed by, for example, stamping ceramic sheets with use of the side surfaces P and Q of the multi-layer chip 105 or applying ceramic slurry to the side surfaces P and Q of the multi-layer chip 105. Examples of a method of applying the ceramic slurry to the side surfaces P and Q of the multi-layer chip 105 include a dipping method.

As described above, an unsintered body 111 as shown in FIG. 12 is obtained.

A form of the unsintered body 111 can be determined in accordance with a form of a sintered body 11. For example, in order to obtain the body 11 with the size of 1.0 mm×0.5 mm×0.5 mm, the unsintered body 111 with the size of 1.2 mm×0.6 mm×0.6 mm can be produced.

3.5 Step S1-05: Formation of Recesses

Figure 12:
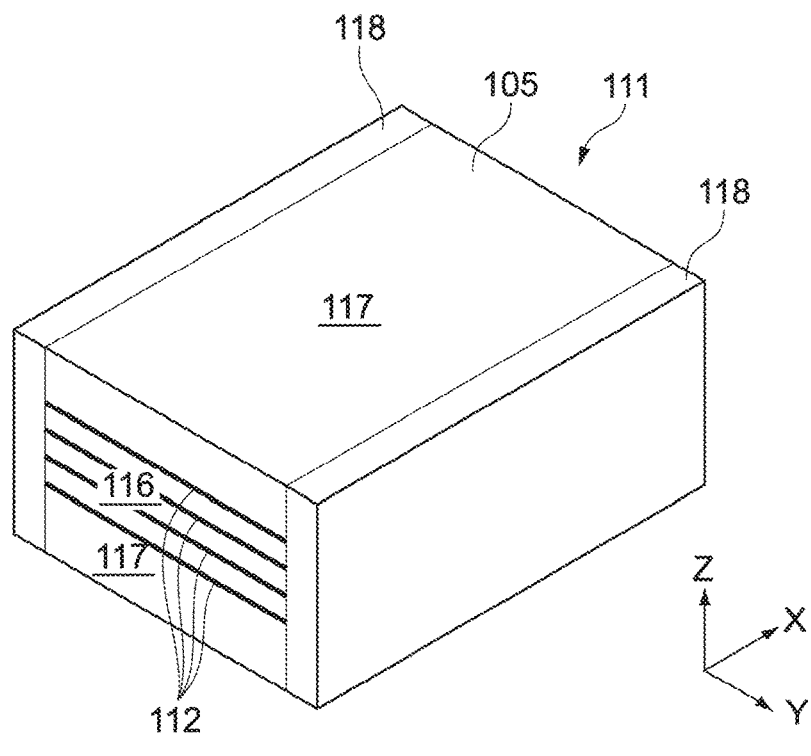
FIG. 12 is a perspective view of a body after Step S1-04 of the production example 1.
Figure 13:
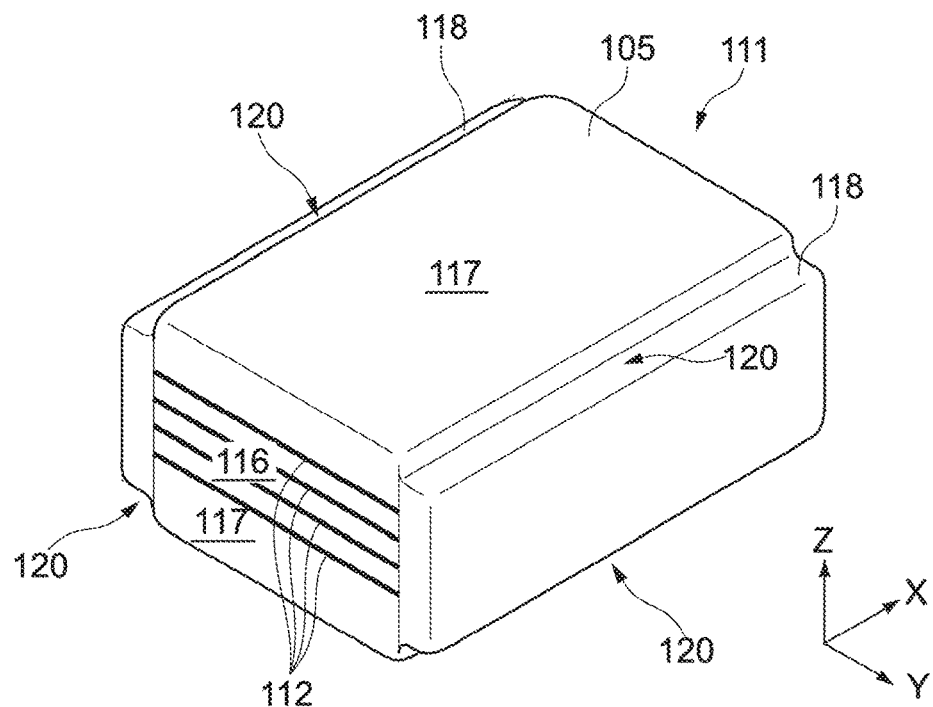
FIG. 13 is a perspective view of the body after Step S1-05 of the production example 1.

In Step S1-05, recesses 120 are formed in the unsintered body 111 obtained in Step S1-04 shown in FIG. 12, to produce the unsintered body Ill shown in FIG. 13. Step S1-05 can be executed by various methods, and an example thereof will be described as follows.

For example, the side margins 118 of the unsintered body 111 shown in FIG. 12 are dried to shrink in the Z-axis direction, so that the recesses 120 of the unsintered body 111 shown in FIG. 13 can be formed. In order to cause the side margins 118 to easily shrink at the drying, the side margins 118 are desirably formed by application of ceramic slurry in Step S1-04 (formation of side margins).

Alternatively, processing for forming the recesses 120 in the unsintered body 111 shown in FIG. 12 is performed, so that the unsintered body 111 shown in FIG. 13 can be produced. Examples of the processing for forming the recesses 120 in the unsintered body Ill include barrel polishing, laser irradiation, and sandblasting. Besides, the recesses 120 may be formed by pressing the side margins 118 to be deformed.

In one example, a method of performing barrel polishing on the unsintered body 111 shown in FIG. 12 to form the recesses 120 will be described. The barrel polishing can be executed by, for example, putting the unsintered bodies 111, a polishing medium, and liquid into a barrel container and imparting rotational motions or vibrations to the barrel container.

As described above, the multi-layer chip 105 achieves high density by hydrostatic pressing, uniaxial pressing, or the like in Step S1-02 performed before the cutting in Step S1-03. Meanwhile, in Step S1-04, in order to prevent the layers of the multi-layer chip 105 from being peeled off, a large pressure is not applied to the side margins 118 formed on the multi-layer chip 105. Thus, the side margins 118 are not provided with high density.

Therefore, in the unsintered body 111 shown in FIG. 12, the side margins 118 have a lower density than that of the multi-layer chip 105. As a result, when the unsintered body 111 shown in FIG. 12 is subjected to barrel polishing, the side margins 118 having a low density are worn more largely than the multi-layer chip 105 having a high density. With this configuration, in the unsintered body 111 shown in FIG. 13 obtained after the barrel polishing, both ends of the side margins 118 in the Z-axis direction are largely worn, so that the recesses 120 are formed.

It should be noted that in the unsintered body 111 after the barrel polishing shown in FIG. 13 both ends of the side margins 118 in the X-axis direction may also be largely worn in addition to both the ends of the side margins 118 in the Z-axis direction. In this case, the amount of wear of each end of the side margins 118 in the X-axis direction needs to fall within a range that does not reach the first and second internal electrodes 112 and 113 drawn to the other side opposite to the end.

3.6 Step S1-06: Sintering

In Step S1-06, the unsintered body 111 obtained in Step S1-05 shown in FIG. 13 is sintered to produce the body 11 of the multi-layer ceramic capacitor 10 shown in FIGS. 1 to 3. Sintering can be performed in a reduction atmosphere or a low-oxygen partial pressure atmosphere, for example.

3.7 Step S1-07: Formation of External Electrodes

In Step S1-07, the first external electrode 14 and the second external electrode 15 are formed on the body 11 obtained in Step S1-06, to produce the multi-layer ceramic capacitor 10 shown in FIGS. 1 to 3.

In Step S1-07, first, an unsintered electrode material is applied so as to cover one of the end surfaces of the body 11 and then applied so as to cover the other one of the end surfaces of the body 11, both the end surfaces being oriented in the X-axis direction.

In order to make the first external electrode 14 and the second external electrode 15 thin, an electrical conductive paste having a low viscosity can be selected for the unsintered electrode material. A method of applying the unsintered electrode material is not limited to a specific method as long as the unsintered electrode material can be filled into the recesses 20 of the body 11. Examples of the method of applying the unsintered electrode material include a dipping method.

Next, the unsintered electrode materials applied to the body 11 are subjected to baking in a reduction atmosphere or a low-oxygen partial pressure atmosphere, for example, to form base films on the body 11. On the base films baked onto the body 11, intermediate films and surface films are formed by plating such as electrolytic plating. Thus, the first external electrode 14 and the second external electrode 15 are completed.

In this embodiment, since the base films cover the body 11 without disconnection at the recesses 20, it is possible to prevent a plating solution from infiltrating between the body 11 and the base films during plating.

It should be noted that part of the treatment in Step S1-07 described above may be performed before Step S1-06. For example, before Step S1-06, the unsintered electrode material may be applied to both the end surfaces of the unsintered body 111 that are oriented in the X-axis direction, and in Step S1-06, the unsintered body 111 may be sintered and, simultaneously, the unsintered electrode material may be baked to form base layers of the first external electrode 14 and the second external electrode 15.

3.8 Modified Example of Production Example 1

In the production example 1, Step S1-05 (formation of recesses) is not obligatory. In other words, if the unsintered body 111 previously including the recesses 120 shown in FIG. 14 is obtained in Step S1-04 (formation of side margins), it is unnecessary to form the recesses 120 posteriori.

Figure 14:
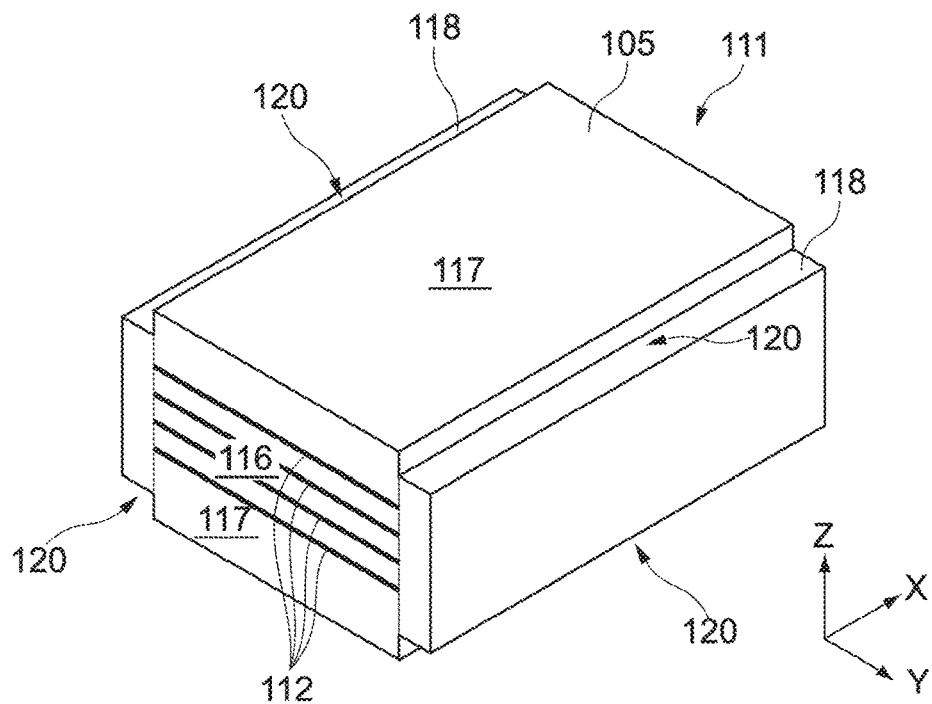
FIG. 14 is a perspective view of a body in a modified example of the production example 1.

For example, when the side margins 118 that are short in the Z-axis direction are disposed on the side surfaces P and Q of the multi-layer chip 105, the unsintered body 111 shown in FIG. 14 is obtained. Further, also when conditions for stamping ceramic sheets with use of the side surfaces P and Q of the multi-layer chip 105 are adjusted such that the side margins 118 become short in the Z-axis direction, the unsintered body 111 shown in FIG. 14 is obtained.

4. Production Example 2 of Multi-Layer Ceramic Capacitor 10

Figure 15:
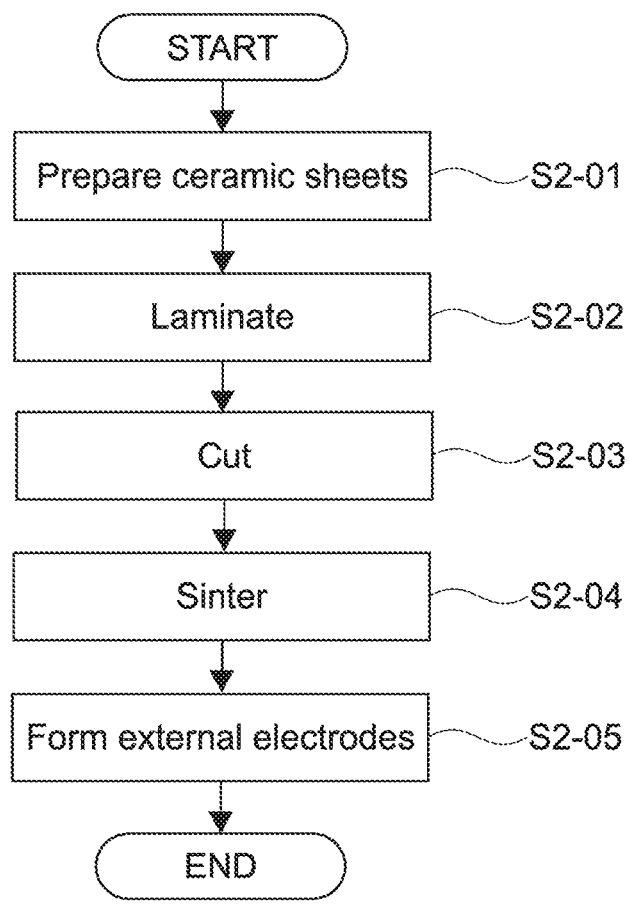
FIG. 15 is a flowchart showing a production example 2 of the multi-layer ceramic capacitor.

FIG. 15 is a flowchart showing a production example 2 of the multi-layer ceramic capacitor 10. FIGS. 16A to 19 are views each showing a process of the production example 2 of the multi-layer ceramic capacitor 10. Hereinafter, the production example 2 of the multi-layer ceramic capacitor 10 will be described along FIG. 15 with reference to FIGS. 16A to 19 as appropriate. In the production example 2, description on a configuration similar to that of the production example 1 will be omitted as appropriate.

4.1 Step S2-01: Preparation of Ceramic Sheets

In Step S2-01, first ceramic sheets 101a and second ceramic sheets 102a for forming the capacitance forming unit 16 and the side margins 18, and third ceramic sheets 103a and fourth ceramic sheets 103b for forming the covers 17 are prepared.

FIGS. 16A, 16B, 16C, and 16D are plan views of the first, second, third, and fourth ceramic sheets 101a, 102a, 103a, and 103b, respectively. FIG. 16A shows the first ceramic sheet 101a, FIG. 16B shows the second ceramic sheet 102a, FIG. 16C shows the third ceramic sheet 103a, and FIG. 16D shows the fourth ceramic sheet 103b.

Unsintered first internal electrodes 112 corresponding to the first internal electrodes 12 are formed on the first ceramic sheet 10a, and unsintered second internal electrodes 113 corresponding to the second internal electrodes 13 are formed on the second ceramic sheet 102a. It should be noted that no internal electrodes are formed on the third and fourth ceramic sheets 103a and 103b corresponding to the covers 17.

The first and second internal electrodes 112 and 113 on the first and second ceramic sheets 101a and 102a are patterned at intervals in the Y-axis direction such that the side margins 118 are formed therebetween. Thus, in the production example 2, it is unnecessary to perform Step S1-04 (formation of side margins) of the production example 1.

The fourth ceramic sheet 103b is made of material having a larger shrinking percentage at sintering than that of the other first, second, and third ceramic sheets 101a, 102a, and 103a.

A method of increasing the shrinking percentage of the fourth ceramic sheet 103b at sintering can be optionally selected from well-known methods.

For example, the fourth ceramic sheet 103b can be formed to have a composition that is easier to generate a liquid phase at sintering than that of the other first, second, and third ceramic sheets 101a, 102a, and 103a. In this case, the fourth ceramic sheet 103b can contain a larger amount of silicon oxide, boron nitride, or the like, which forms a glass component, than that of the other first, second, and third ceramic sheets 101a, 102a, and 103a.

Further, the fourth ceramic sheets 103b can contain a smaller proportion of base powder, which becomes a solid component after sintering, than that of the other first, second, and third ceramic sheets 101a, 102a, and 103a.

Furthermore, in the fourth ceramic sheets 103b, an average particle diameter of the base powder can be made smaller than that of the other first, second, and third ceramic sheets 101a, 102a, and 103a.

4.2 Step S2-02: Lamination

Figure 17:
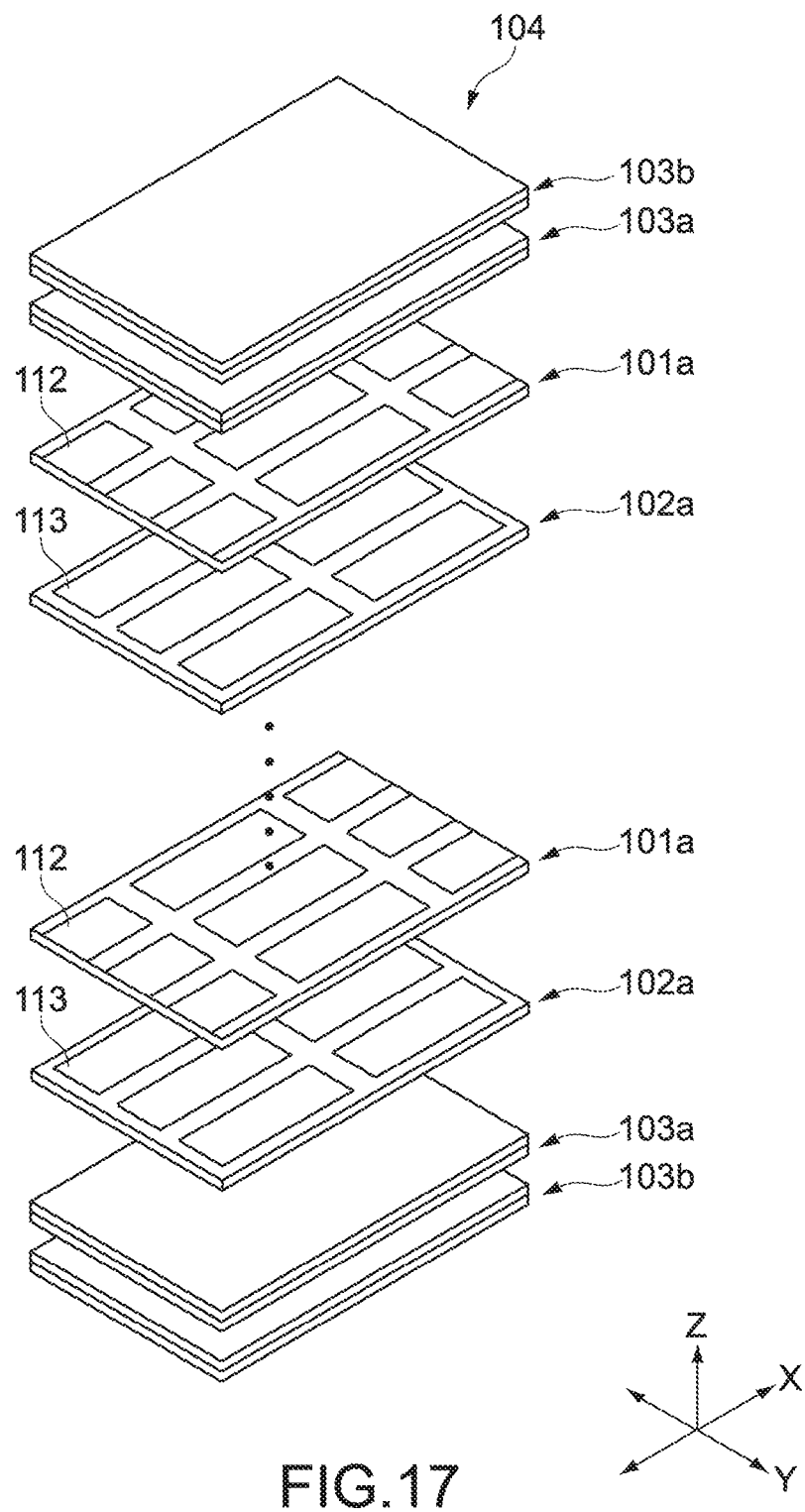
FIG. 17 is a perspective view of a multi-layer sheet produced in Step S2-02 of the production example 2.

In Step S2-02, the first, second, third, and fourth ceramic sheets 101a, 102a, 103a, and 103b prepared in Step S2-01 are laminated, to produce a multi-layer sheet 104 shown in FIG. 17.

In the multi-layer sheet 104, the first ceramic sheets 101a and the second ceramic sheets 102a that correspond to the capacitance forming unit 16 and the side margins 18 are alternately laminated in the Z-axis direction.

Further, in the multi-layer sheet 104, the third ceramic sheets 103a are disposed on the uppermost and lowermost surfaces of the first and second ceramic sheets 101a and 102a alternately laminated in the Z-axis direction, and the fourth ceramic sheets 103b are further disposed on those third ceramic sheets 103a. It should be noted that in the example shown in FIG. 17 two third ceramic sheets 103a and two fourth ceramic sheets 103b are laminated on each of the uppermost and lowermost surfaces of the laminated first and second ceramic sheets 101a and 102a, but the number of third and fourth ceramic sheets 103a and 103b can be changed as appropriate.

4.3 Step S2-03: Cutting

Figure 18:
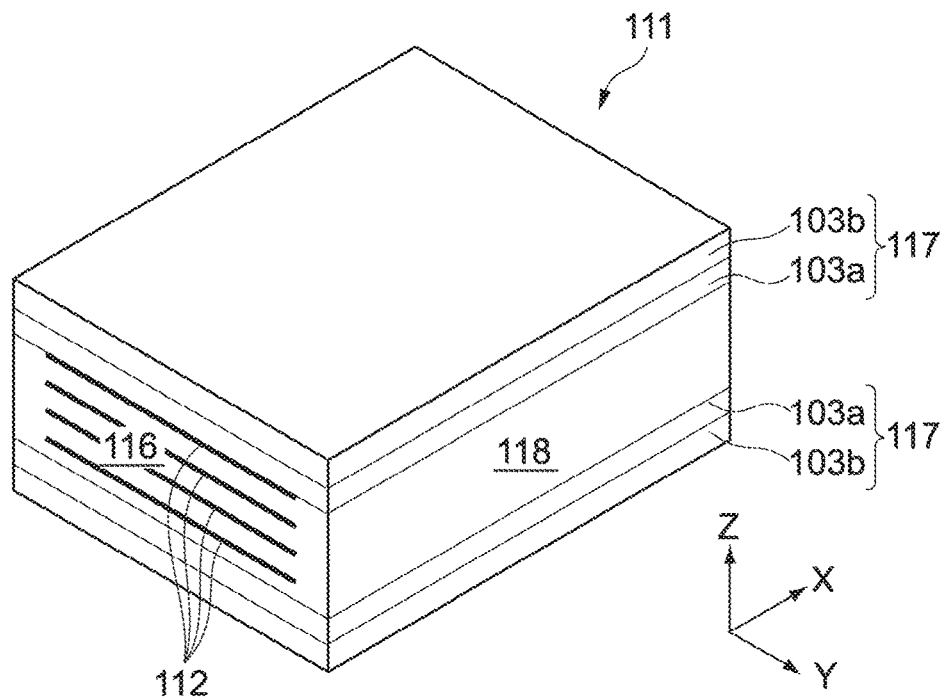
FIG. 18 is a perspective view of a multi-layer chip after Step S2-03 of the production example 2.

In Step S2-03, the multi-layer sheet 104 obtained in Step S2-02 is cut to produce unsintered bodies 111 shown in FIG. 18.

4.4 Step S2-04: Sintering

Figure 19:
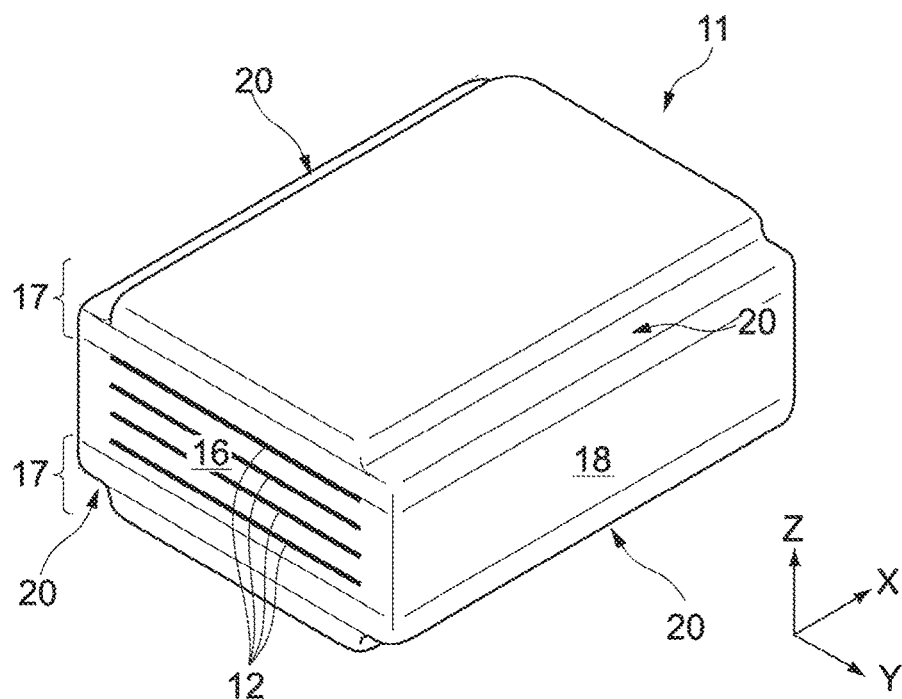
FIG. 19 is a perspective view of the multi-layer chip after Step S2-04 of the production example 2.

In Step S2-04, the unsintered body 111 obtained in Step S2-03 shown in FIG. 18 is sintered to produce a body 11 shown in FIG. 19.

In Step S2-04, the fourth ceramic sheets 103b shrink in the Y-axis direction more largely than the first, second, and third ceramic sheets 101a, 102a, and 103a. With this configuration, recesses 20 are formed at both ends of the covers 17 of the body 11 in the Y-axis direction.

It should be noted that in Step S2-04 the fourth ceramic sheets 103b may shrink in the X-axis direction more largely than the first, second, and third ceramic sheets 101a, 102a, and 103a. With this configuration, recesses may be allowed to be formed at both ends of the covers 17 in the X-axis direction in the sintered body 11 shown in FIG. 19.

4.5 Step S2-05: Formation of External Electrodes

Step S2-05 is similar to Step S1-07 of the production example 1.

4.6 Modified Example of Production Example 2

In the production example 2, a configuration in which the shrinking percentage of the fourth ceramic sheets 103b is larger than that of the other first, second, and third ceramic sheets 101a, 102a, and 103a is not obligatory.

Figure 20:
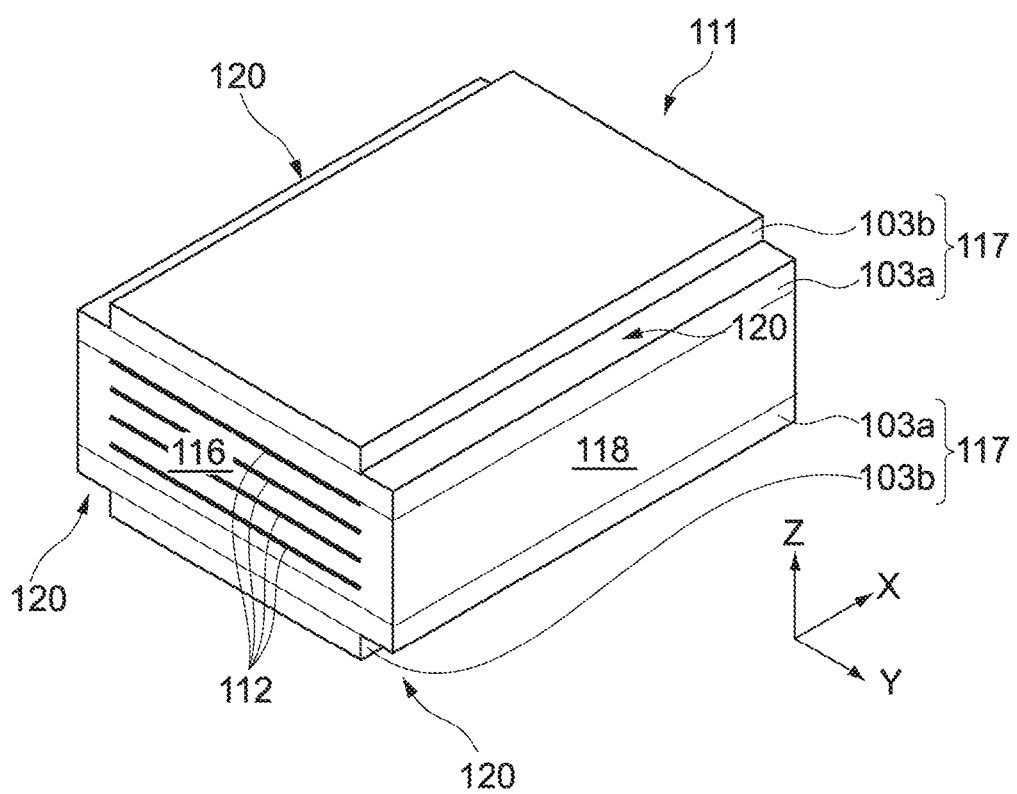
FIG. 20 is a perspective view of a body in a modified example of the production example 2.

For example, as shown in FIG. 20, an unsintered body 111 can be produced in which the fourth ceramic sheets 103b have a dimension smaller than that of the third ceramic sheets 103a in the Y-axis direction. With this configuration, recesses 120 are previously formed on the unsintered body 111. Thus, it is unnecessary to cause only the fourth ceramic sheets 103b to largely shrink in Step S2-04 (sintering).

Further, in the production example 2, forming covers 117 using two types of ceramic sheets 103a and 103b is not obligatory.

For example, the covers 117 may be formed of only the fourth ceramic sheets 103b. In this case, in Step S2-04 (sintering), the whole of the covers 117 shrinks in the Y-axis direction more largely than the first and second ceramic sheets 101a and 102a, and recesses 20 are thus formed at both ends of the covers 17 in the Y-axis direction.

Furthermore, the covers 117 may be formed of three types or more of ceramic sheets.

5. Other Embodiments

While the embodiment of the present invention has been described, the present invention is not limited to the embodiment described above, and it should be appreciated that the present invention may be variously modified.

For example, in the embodiment described above, the recesses 20 are each formed over the entire width of the body 11 in the X-axis direction, but the recesses 20 may be formed at least at the corners of the body 11. In other words, the recesses 20 may not be continuous between the respective corners of the body 11. For example, the recesses 20 may not be formed in areas not covered with the first external electrode 14 and the second external electrode 15 of the body 11.

Further, in the multi-layer ceramic capacitor 10, the recesses 20 are desirably provided to all of the four ridges of the side surfaces and main surfaces of the body 11 as described in the above embodiment, but this configuration is not obligatory. In other words, in the multi-layer ceramic capacitor 10, if the recess 20 is provided to at least one of the four ridges of the body 11, effects of the embodiment can be obtained.

Furthermore, in the embodiment described above, since the body 11 has a hexahedral shape, the recesses 20 are provided along the ridges of the side surfaces and main surfaces of the body 11. However, the body 11 may not have a hexahedral shape and only needs to have a plurality of surfaces extending between both the end surfaces. In this case, if the recesses 20 are provided along the ridges of the plurality of surfaces of the body 11, effects similar to those of the embodiment can be obtained.

In addition, in the embodiment described above, the multi-layer ceramic capacitor 10 has been described as an example of a ceramic electronic component, but the present invention can be applied to any other ceramic electronic components each including a pair of external electrodes. Examples of such ceramic electronic components include an inductor and a piezoelectric element.

What is claimed is:

1. A ceramic electronic component, comprising:
   a body including
      a first end surface and a second end surface that face each other,
      surfaces each extending between the first end surface and the second end surface,
      an outer edge that is provided along the surfaces and includes recesses, the recesses extending from the first end surface and the second end surface along ridges of the surfaces, and
      a functional unit that is disposed inward relative to the outer edge; and
   a first external electrode and a second external electrode that respectively cover the first end surface and the second end surface and extend to come close to each other from the first end surface and the second end surface while covering the surfaces and the recesses.

2. The ceramic electronic component according to claim 1, wherein
   each of the first external electrode and the second external electrode is disposed at each of the recesses inward relative to a line of intersection, at which planes respectively extended from the surfaces intersect with one another.

3. The ceramic electronic component according to claim 1, wherein the surfaces include a first main surface, a second main surface, a first side surface, and a second side surface, the first main surface and the second main surface facing each other, the first side surface and the second side surface facing each other, and
   the outer edge includes a first cover, a second cover, a first side margin, and a second side margin, the first cover and the second cover being respectively provided along the first main surface and the second main surface, the first side margin and the second side margin being respectively provided along the first side surface and the second side surface.

4. The ceramic electronic component according to claim 3, wherein
   a depth of each of the recesses from the first main surface and the second main surface is equal to or smaller than a thickness of each of the first cover and the second cover, and
   a depth of each of the recesses from the first side surface and the second side surface is 40% or less of a thickness of each of the first side margin and the second side margin.

5. The ceramic electronic component according to claim 3, wherein
   a depth of each of the recesses from the first side surface and the second side surface is equal to or smaller than a thickness of each of the first side margin and the second side margin, and
   a depth of each of the recesses from the first main surface and the second main surface is 40% or less of a thickness of each of the first cover and the second cover.

6. The ceramic electronic component according to claim 1, wherein
   the outer edge has a thickness of 2 μm or more and 100 μm or less.

7. A method of producing a ceramic electronic component, the ceramic electronic component including
   a body including
      a first end surface and a second end surface that face each other,
      surfaces each extending between the first end surface and the second end surface,
      an outer edge that is provided along the surfaces, and
      a functional unit that is disposed inward relative to the outer edge, and
   a first external electrode and a second external electrode that respectively cover the first end surface and the second end surface and extend to come close to each other from the first end surface and the second end surface along the surfaces,
   the method comprising
   forming recesses on the outer edge, the recesses extending from the first end surface and the second end surface along ridges of the surfaces and then forming the first external electrode and the second external electrode to cover the surfaces and the recesses.

8. The method of producing a ceramic electronic component according to claim 7, wherein
   the outer edge includes a first cover, a second cover, a first side margin, and a second side margin, the first cover and the second cover facing each other, the first side margin and the second side margin facing each other.

9. The method of producing a ceramic electronic component according to claim 8, wherein
   the first side margin and the second side margin are formed on a multi-layer chip to produce the body, the multi-layer chip including the functional unit, the first cover, and the second cover that are pressure-bonded to one another, the body being unsintered.

10. The method of producing a ceramic electronic component according to claim 9, wherein
    the first side margin and the second side margin that are formed on the body are dried to shrink, to form the recesses, the body being unsintered.

11. The method of producing a ceramic electronic component according to claim 9, wherein
    the body is subjected to processing to form the recesses, the body being unsintered.

12. The method of producing a ceramic electronic component according to claim 11, wherein
    the processing includes barrel polishing.

13. The method of producing a ceramic electronic component according to claim 8, wherein
    the body is produced, the body being unsintered and including the first cover and the second cover that are made of a material having a larger shrinking percentage at sintering than a material of the functional unit, the first side margin, and the second side margin, and
    the unsintered body is sintered to form the recesses.

14. The method of producing a ceramic electronic component according to claim 13, wherein
    the first cover and the second cover are made of a material that is easier to generate a liquid phase at sintering than the material of the functional unit, the first side margin, and the second side margin.

15. The method of producing a ceramic electronic component according to claim 13, wherein
the first cover and the second cover are made of a material having a smaller proportion of base powder than the material of the functional unit, the first side margin, and the second side margin.

16. The method of producing a ceramic electronic component according to claim 13, wherein
the first cover and the second cover are made of a material having a smaller average particle diameter of base powder than the material of the functional unit, the first side margin, and the second side margin.

* * * * *